(12) United States Patent
Mandyam

(10) Patent No.: US 12,433,786 B2
(45) Date of Patent: Oct. 7, 2025

(54) HICCUP REMEDY

(71) Applicant: Anand A. Mandyam, San Diego, CA (US)

(72) Inventor: Anand A. Mandyam, San Diego, CA (US)

( * ) Notice: Subject to any disclaimer, the term of this patent is extended or adjusted under 35 U.S.C. 154(b) by 350 days.

(21) Appl. No.: 18/318,139

(22) Filed: May 16, 2023

(65) Prior Publication Data
US 2024/0382340 A1    Nov. 21, 2024

(51) Int. Cl.
*A61F 7/12* (2006.01)
*A61F 7/00* (2006.01)

(52) U.S. Cl.
CPC ........ *A61F 7/12* (2013.01); *A61F 2007/0015* (2013.01); *A61F 2007/0017* (2013.01); *A61F 2007/0098* (2013.01)

(58) Field of Classification Search
CPC ...... A61F 2007/0015; A61F 2007/0017; A61J 7/0046
See application file for complete search history.

(56) References Cited

U.S. PATENT DOCUMENTS

| | | | |
|---|---|---|---|
| 4,210,141 A | 7/1980 | Brockman et al. | |
| 6,152,953 A | 11/2000 | Hipskind | |
| 2005/0080458 A1 | 4/2005 | Ehlinger | |
| 2021/0045556 A1 | 2/2021 | Seifi | |

OTHER PUBLICATIONS

"How to get rid of hiccups: What causes hiccups and quick remedies that actually work" by Anna Kaufman and Liam Gravvat; Jul. 23, 2022 (Year: 2022).*
Stopping Hiccups, Harvard Health Publishing, May 8, 2020, https://www.health.harvard.edu/staying-healthy/stopping-hiccups.
Tariq et al, A Case Report of Vagus Nerve Stimulation for Intractable Hiccups, International Journal of Surgery Case Reports 78 (2021) 219-222.

* cited by examiner

*Primary Examiner* — Kaitlyn E Smith
(74) *Attorney, Agent, or Firm* — Mark Wisnosky

(57) ABSTRACT

A non-pharmaceutical hiccup remedy device that makes use of known treatments for hiccups but in a novel way is described. The device is a drinking cup with an extension that applies a cold finger extension to the cheek of the hiccup sufferer user simultaneous to drinking from the cup. The device has been found by the inventor to provide rapid alleviation of hiccups without the discomfort of prior solutions and without the side effects of pharmaceutical treatments for hiccups. The device can be sized and/or, in some embodiments, adjusted for the particular user, from child to adult.

2 Claims, 4 Drawing Sheets

HICCUP REMEDY

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Technical Field

The invention relates to a non-pharmaceutical hiccup remedy.

Related Background Art

Hiccups are a nuisance to people from babies, toddlers, teens, and adults.

"Hiccups are the sudden involuntary contractions of the diaphragm and intercostal muscles. They are generally benign and self-limited, however, in some cases they are chronic and debilitating. There are approximately 4000 [hospital] admissions for hiccups each year in the United States. The hiccup reflex arc is composed of three components: (1) an afferent limb including the phrenic, vagus, and sympathetic nerves, (2) the central processing unit in the midbrain, and (3) the efferent limb carrying motor fibers to the diaphragm and intercostal muscles . . . " (Nausheen, F., Mohsin, H. & Lakhan, S. E. Neurotransmitters in hiccups. SpringerPlus 5, 1357 (2016). https://doi.org/10.1186/s40064-016-3034-3, bracketed comment added,).

There are a wide variety of indicated causes for hiccups. Overeating, overdrinking, psychological causes, nerve damage, etc. There are also an equally wide variety of treatments both pharmaceutical and non-pharmaceutical. For chronic or debilitating hiccup bouts there are a wide variety of pharmaceutical treatments that are known to affect neurotransmitters such as GABA, dopamine, serotonin, epinephrine, norepinephrine, acetylcholine, and histamine (ibid). All have their own side effects and risks. Non-pharmaceutical treatments include massage, acupressure, acupuncture, drinking cold water, application of cold, and extremes such as surgery on the nerves known to be related to hiccups.

There are known hiccup treatment devices that combine a drinking cup with extensions attached to the lip of the cup. U.S. Pat. No. 4,210,141 by Brockman et al teaches a cup with an extension that is used as a tongue depressor while drinking. Ehlinger Jr. in U.S. Pat. No. 7,062,320 describe a cup with an attached galvanic device to stimulate particular nerves using an electric current applied to the user's temple while drinking.

There is still a need for improvement in hiccup remedies. The pharmaceutical treatments have risks and many of the known non-pharmaceutical treatments also have risks, and at least a fair likelihood of discomfort. Drinking cold water and applying a cold compress to the face are known treatments for hiccups. However there are no heretofore known simple devices that applies both these treatments simultaneously.

An object of the present invention is to provide such a device.

BRIEF SUMMARY OF THE INVENTION

This invention is simple and uses stainless steel cup with an extension that touches the cheeks to stop hiccups using cool temperature as the mode of action. This cup has a stainless steel extension attached to the cup and stops hiccups when used to drink ice cold water.

The claimed invention differs from what currently exists. The prior inventions use either a galvanic device or a tongue depressor, whereas this invention uses an extension from a cup that touches the cheek while drinking from the cup and stops hiccups using temperature. This invention is an improvement on what currently exists in ease of use and comfort.

The vagus nerve controls peristalsis, and the phrenic nerve controls the diaphragm, the major respiratory muscle. Drinking the cold water as the rod/bar/wand touches the cheek at the same time reduces the speed of action potential or conduction velocity as it travels down the axon of the nerves. Drinking cold water while applying a cold surface to the cheek affects both nerves and stops triggering the reflexes causing hiccups to stop.

DETAILED DESCRIPTION OF THE INVENTION

Figure 1:
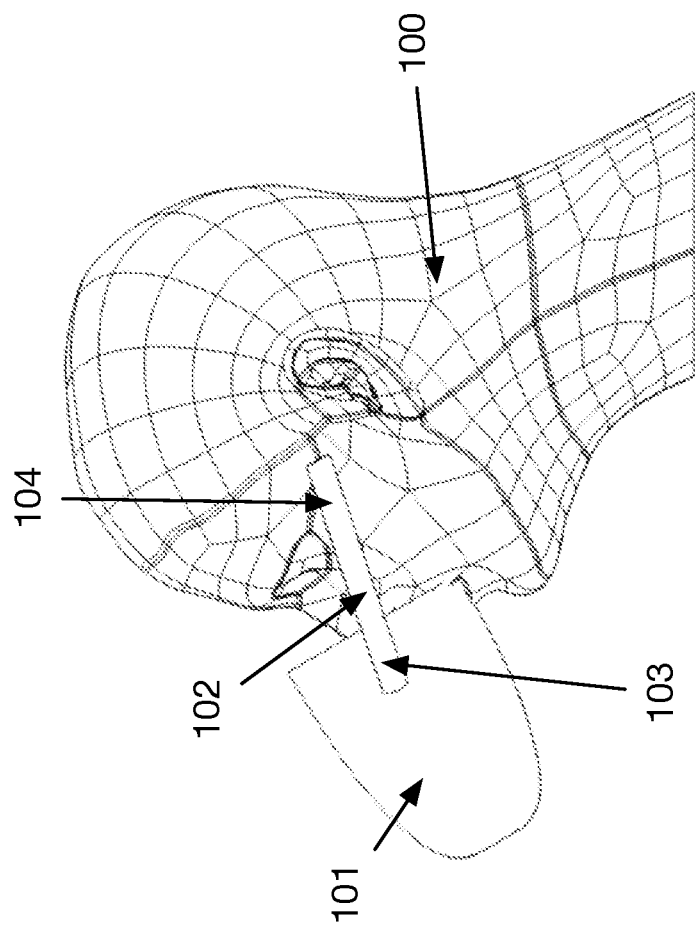
FIG. 1 is a left side view of the hiccup remedy showing the invention in use.

FIG. 1 shows a first embodiment of the invented device as employed by a user 100. The device, shown in a left hand view, includes a cup 101 to which is attached a flat rectangular extension 102. The extension is comprised of a lower portion 103 that is attached to the cup in such a manner as to orient the upper portion 104 to contact the user's cheek, here shown contacting at the cheek bone. The lower portion 103 is attached to the cup 101 to ensure thermal contact to the cup such that the upper portion of the extension 104 is cooled to the temperature of the contents of the cup. In a preferred embodiment both the cup 101 and the extension 102 are made from stainless steel and the extension is welded to the cup in the region 103. In another embodiment the extension is glued to the cup, preferably using an epoxy glue that is filled with particulate that ensures thermal conductivity such as Thermally Conductive Epoxy Adhesive TC-2810 as sold by 3M corporation. The length of the extension 104 above the rim of the cup and the angle of attachment to the cup in the lower region 103 of the extension determines where on the user's cheek the upper portion 104 of the extension contacts the user's cheek. In other embodiments, discussed below the contact location and pressure on the user's cheek are adjustable. Like numbers in subsequent drawings refer to the same parts.

Figure 2:
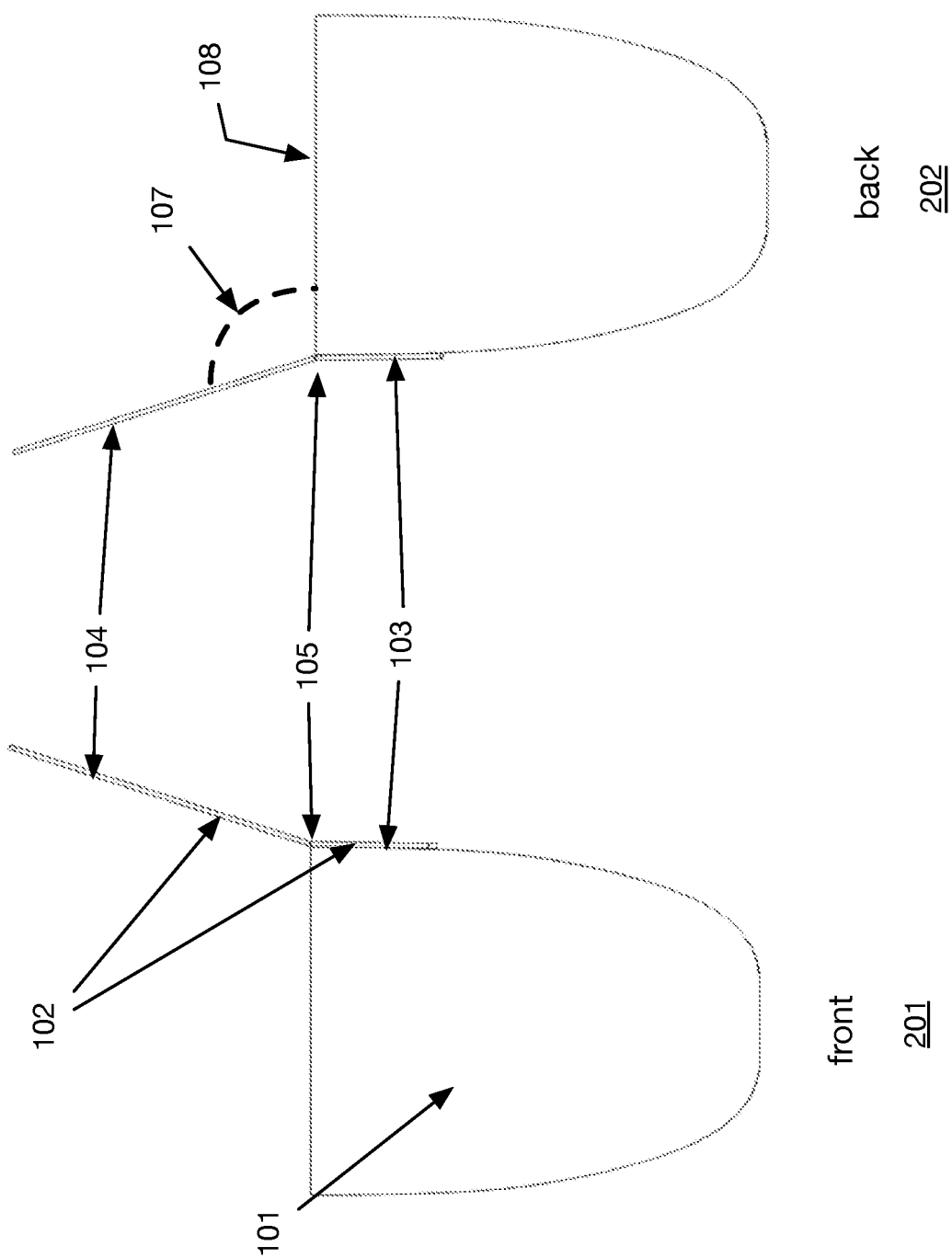
FIG. 2 shows front and back views of an embodiment of the hiccup remedy.

Referring now to FIG. 2, front 201 and back 202 views of the invented hiccup device are shown. The cup 101 includes and extension 102, shown now in a side view. The extension is attached to the outer surface of the cup in a lower region 103. An upper region 104 of the extension 102 forms an angle 107 with the plane 108 of the rim of the cup 101. The angle 107 is adjusted by bending along a line 105 of the extension that is intersected by the plane 108 of the rim of the cup 101. The angle 107 is adjusted such that the upper portion 104 of the extension 102 contacts the user's cheek when the user drinks from the cup.

Figure 3:
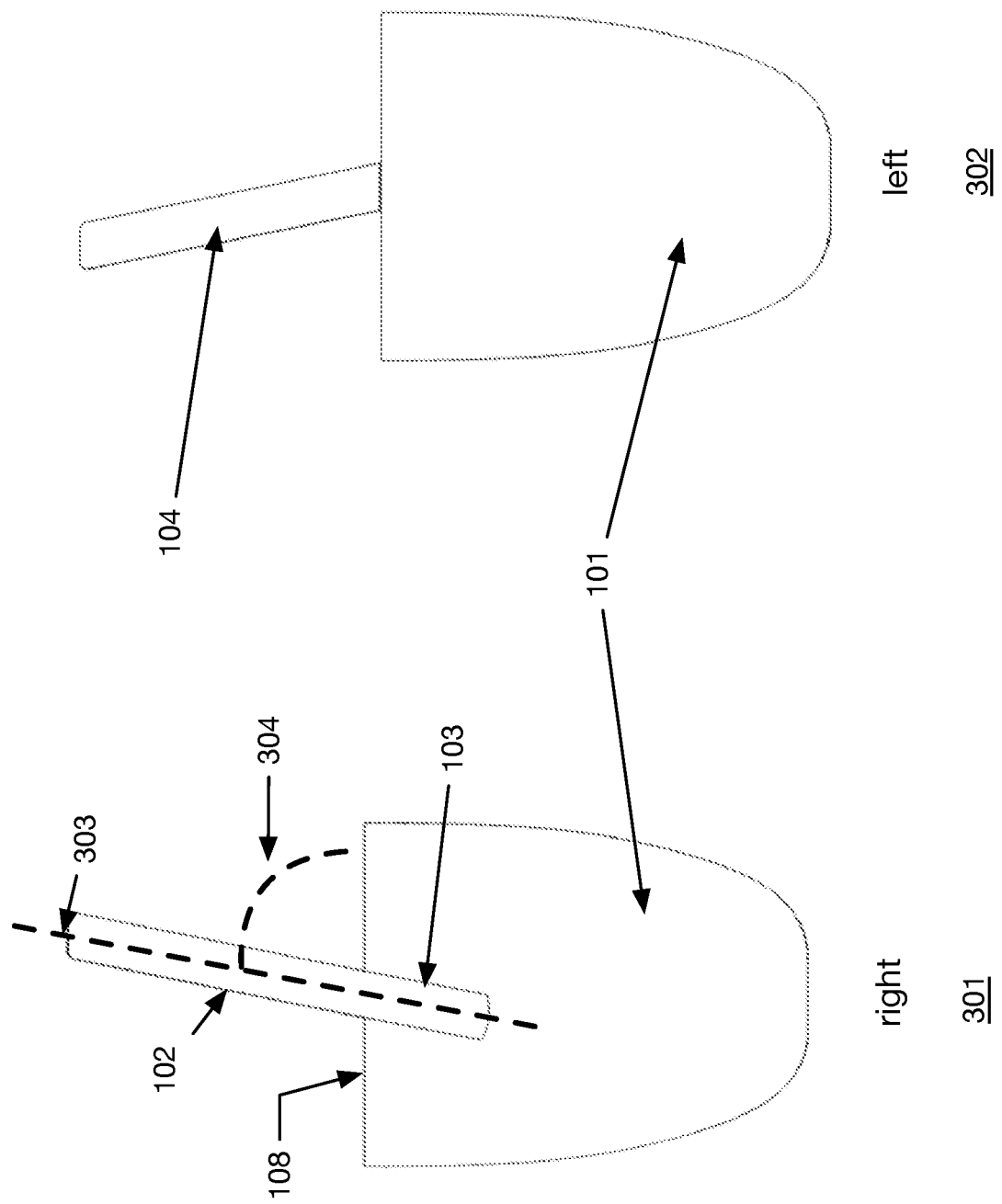
FIG. 3 shows right and left side views of the hiccup remedy and additional construction details.

FIG. 3 shows right 301 and left 302 side views of the invented hiccup remedy. The extension 102 is attached to the cup 101 making an angle 304 with a central longitudinal axis 303 of the extension and the plane 108 of the lip of the cup. In one embodiment the angle 304 is permanently fixed when the lower portion 103 of the extension is attached to the cup 101. The angle 304 is selected such that the upper portion 104 of the extension 102 contacts the cheek of the user as shown in FIG. 1. In another embodiment, discussed below, the angle 304 is adjustable even after attaching the extension 102 to the cup 101.

Figure 4:
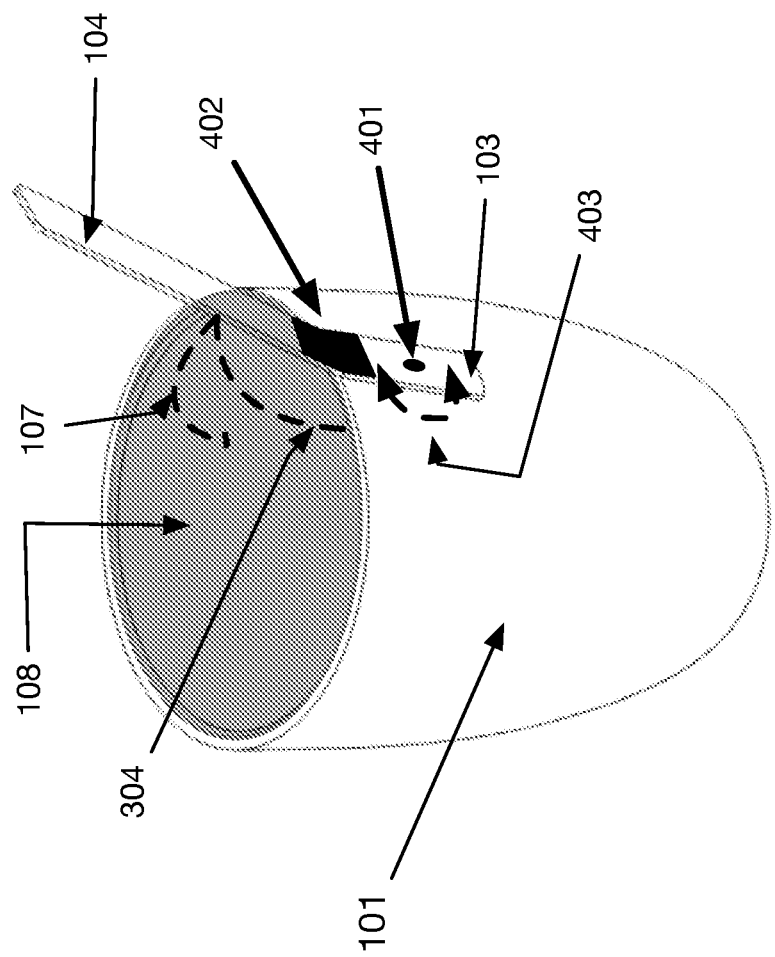
FIG. 4 shows a perspective view and details of another embodiment of the hiccup remedy.

FIG. 4 shows a perspective view of another embodiment of the hiccup remedy. In this embodiment a cup 101 includes and extension including a lower portion 103 that is connected at a point 401 using either a rivet or screw and the extension can be rotated in the direction 403 about the point 401 and thereby change the angle 304. The extension further includes a region 402 that may be bent to adjust the angle 107 between the extension and the plane 108 of the rim of the cup. The plane 108 shown as shaded. Adjustment of the angle 107 allows adjustment for the shape and size of the user's head and face to ensure firm contact of the extension with the cheek of the user when the hiccup remedy is used. In another embodiment, the extension comprising the upper 104 and lower 103 portions along with the connection point 401 and the bendable section 402 may be removed from the cup 101 and used with a different cup. In one embodiment the extension 103, 104, 401, 402 is separately refrigerated or frozen, attached to a cup for use, thereby ensuring a very cold extension applied to the cheek of the user. The features and embodiments of the invented hiccup remedy as presented in all figures above may be mixed and matched.

SUMMARY

A non-pharmaceutical hiccup remedy device that makes use of known treatments for hiccups but in a novel way is described. The device is a drinking cup with an extension that applies a cold finger extension to the cheek of the hiccup sufferer user simultaneous to drinking from the cup. The device has been found by the inventor to provide rapid alleviation of hiccups without the discomfort of prior solutions and without the side effects of pharmaceutical treatments for hiccups. The device can be sized and/or, in some embodiments, adjusted for the particular user, from child to adult.

What is claimed:

1. A hiccup remedy comprising:
   a) a cup, the cup containing a cold beverage that is drunk by a user, and,
   b) a rectangular extension applied to an outer surface of the cup, the rectangular extension having a longitudinal axis extending above the rim of the cup and a flat surface that contacts the cheek of a user when the user drinks the cold beverage from the cup, and,
   c) the rectangular extension attached to the cup such that the rectangular extension is cooled by the cold beverage, thereby applying cold to the user's cheek when drinking the cold beverage from the cup, and,
   d) the rectangular extension is attached to the cup at a point using a screw or a rivet and the rectangular extension may be adjusted by rotating about the point and thereby adjusting a location that the flat surface contacts the cheek of the user.

2. A hiccup remedy comprising:
   a) a cup, the cup containing a cold beverage that is drunk by a user, and,
   b) a rectangular extension applied to an outer surface of the cup, the rectangular extension having a longitudinal axis extending above the rim of the cup and a flat surface that contacts the cheek of a user when the user drinks the cold beverage from the cup, and,
   c) the rectangular extension attached to the cup such that the rectangular extension is cooled by the cold beverage, thereby applying cold to the user's cheek when drinking the cold beverage from the cup, and,
   d) the rectangular extension includes a region along a line at a plane of a rim of the cup that may be bent thereby adjusting a location and a pressure that the flat surface contacts the cheek of the user.

* * * * *